United States Patent [19]

McComber et al.

[11] Patent Number: 5,697,265

[45] Date of Patent: Dec. 16, 1997

[54] TROWEL HAVING IMPOSED BLADE STRESSES AND METHOD OF MANUFACTURE

[76] Inventors: Larry J. McComber, P.O. Box 751, Marshalltown,, Iowa 50158; Jack D. Murders, 2570 Sheffield Pl., Fayetteville, Ark. 72703

[21] Appl. No.: 377,323

[22] Filed: Jan. 23, 1995

[51] Int. Cl.$^6$ ............... B21D 1/02; B24C 1/10
[52] U.S. Cl. ............... 76/119; 76/101 R; 72/53; 15/235.4
[58] Field of Search ............... 72/53; 29/90.7; 76/1, 101 R, 119; 15/235.4, 235.5, 235.6, 235.8

[56] References Cited

U.S. PATENT DOCUMENTS

| | | |
|---|---|---|
| 162,355 | 4/1875 | Disston . |
| 2,491,677 | 12/1949 | McCulloch . |
| 2,680,938 | 6/1954 | Peterson . |
| 2,907,151 | 10/1959 | Peterson . |
| 3,073,022 | 1/1963 | Bush et al. ............... 29/553 |
| 3,094,768 | 6/1963 | Croft ............... 29/90 |
| 3,205,556 | 9/1965 | Romans ............... 29/90 |
| 3,482,423 | 12/1969 | Murray et al. ............... 72/53 |
| 3,827,270 | 8/1974 | Neilsen ............... 72/53 |
| 4,167,864 | 9/1979 | Taipale ............... 72/53 |
| 4,258,084 | 3/1981 | Hyden, Sr. ............... 72/53 |
| 4,604,881 | 8/1986 | Lienert ............... 72/53 |
| 4,974,434 | 12/1990 | Reccius et al. ............... 72/53 |

FOREIGN PATENT DOCUMENTS

| | | | |
|---|---|---|---|
| 2202627 | 7/1973 | Germany ............... | 76/119 |
| 1643133 | 4/1991 | U.S.S.R. ............... | 72/53 |
| 1348191 | 3/1974 | United Kingdom ............... | 76/119 |

OTHER PUBLICATIONS

"Metals Handbook", 8th edition, vol. 2, Heat Treating, Cleaning, and Finishing, pp. 398–402 1964.

Primary Examiner—David Jones
Attorney, Agent, or Firm—McAndrews, Held & Malloy, Ltd.

[57] ABSTRACT

A trowel and related method of manufacture in which residual stresses are intentionally imposed upon the bottom working surface and/or the top mounting surface of a trowel blade. Stresses can be imposed, for example, by glass bead peening, shot peening, rolling, and/or brushing the metal trowel blade. Stresses are built up to a working stess level that remains substantially constant with further use of the trowel against abrasive, spreadable surfaces. Imposed stresses on the top and bottom surfaces can also be used to vary the resulting curvature of the blade.

28 Claims, 6 Drawing Sheets

AXIAL STRESS PROFILES

TRANSVERSE STRESS PROFILES

Fig. 9

TROWEL HAVING IMPOSED BLADE STRESSES AND METHOD OF MANUFACTURE

BACKGROUND OF THE INVENTION

The invention relates to trowels for spreading concrete, plaster and other types of spreadable materials, and more particularly relates to the intentional manipulation of stresses in the blade of a trowel during its manufacture.

Spreadable materials such as concrete, plaster, and adhesives are smoothed to achieve a desired surface finish or profile. Such smoothing is done by hand tools that have a flat surface that is drawn across the spreadable material. Such tools include trowels which are typically used to apply the spreadable material as well as to finish the surface.

Trowels constructed with a thin flexible blade are generally preferred for both application and smoothing of the spreadable material. In some applications, the worker desires that his trowel blade be perfectly flat. In other applications, it is desired that the blade be slightly bowed, curving or bending upwardly both in its length and width direction.

Warpage or excessive bowing of the blade is a common problem. The blade of a new trowel, for example, may become warped or bowed during its initial use; even though the trowel blade is made from material having a very high yield strength, it can warp or bow excessively after a few hours' use. Skilled workers will return tools to the manufacturer if their blades warp or bow excessively.

Tool manufacturers purchase flat strip material from which they manufacture trowel blades. The same material is purchased repeatedly over time from the same supplier, but does not necessarily produce consistent trowel blades that have the same warpage or bow after use.

Even though trowels and other tools for applying and smoothing spreadable materials are relatively simple and have been used for many years, warpage and bowing of trowel blades have remained unresolved problems in the art.

SUMMARY OF THE INVENTION

It is an object of the present invention to overcome the disadvantages of tools used to apply and finish spreadable materials containing abrasive particles.

It is a specific object of the present invention to provide a tool for applying and finishing spreadable materials having a blade that will not warp or bow excessively as a result of use.

It is another object of the present invention to provide a blade for a tool for spreading and finishing a spreadable material that will not warp as a result of use with materials containing abrasive particles.

Another object of the present invention is to provide a blade for a tool for spreading and finishing a spreadable material having a working surface that is intentionally stressed during manufacture to the typical residual stress that will be created on the working surface during use with materials containing abrasive particles.

It is a further object of the present invention to provide a method of manufacturing trowel blades.

Yet another object of the present invention is to provide a method of manufacturing a blade for a tool for applying and finishing a spreadable material that will not warp as a result of use with materials containing abrasive particles.

More particularly, a method of manufacturing a blade for a tool for applying and spreading spreadable material is provided with the blade having a residual stress intentionally imposed on the working surface of the blade. This imposed stress is related to the stress that will be imposed on the blade by the intended spreadable material during use.

In one embodiment, a complimentary stress is imposed on the back surface of the blade in order to compensate or control any deformation of the blade due to stress on the working side of the blade. Such a complimentary stress may be used to cause the blade to retain its manufactured shape.

DETAILED DESCRIPTION OF THE PREFERRED EMBODIMENT

Figure 1:
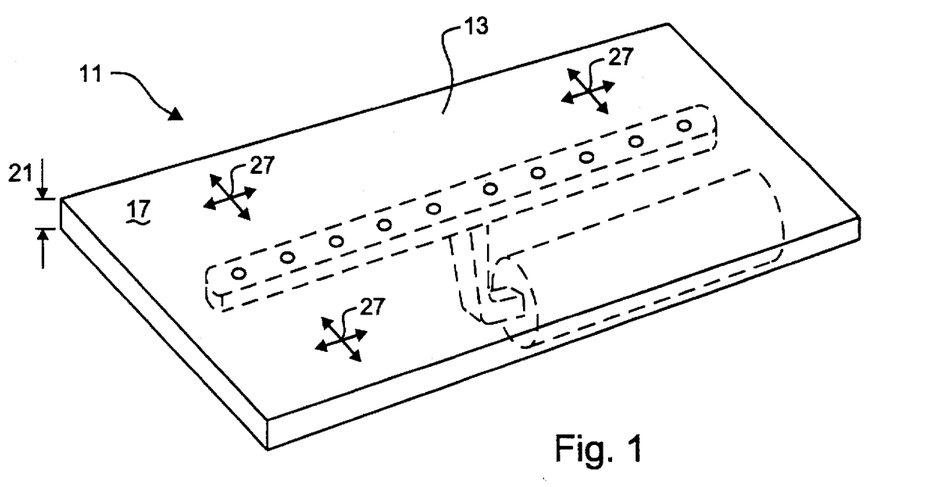
FIG. 1 is a bottom perspective view of a finishing trowel manufactured according to the present invention.
Figure 2:
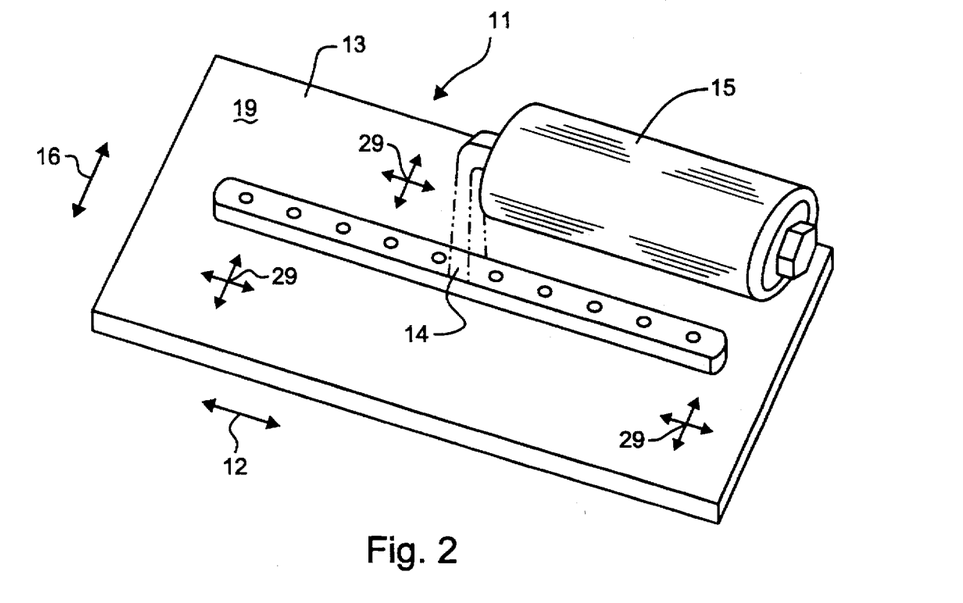
FIG. 2 is a top perspective view of the trowel of FIG. 1.

Referring to FIGS. 1 and 2, a cement trowel 11 is formed of a metal (steel, stainless steel, Monel, etc.) blade 13, a mounting 14 and a handle 15. Blade 13 is formed of a rectangular sheet of metal having a bottom surface 17 and a top surface 19. Surfaces 17, 19 lie in parallel planes separated a distance 21 of the thickness of blade 13. Blade 13 has an axial direction 12 which runs parallel to mounting 14, and a transverse direction 16 which runs perpendicular to mounting 14.

Figure 3:
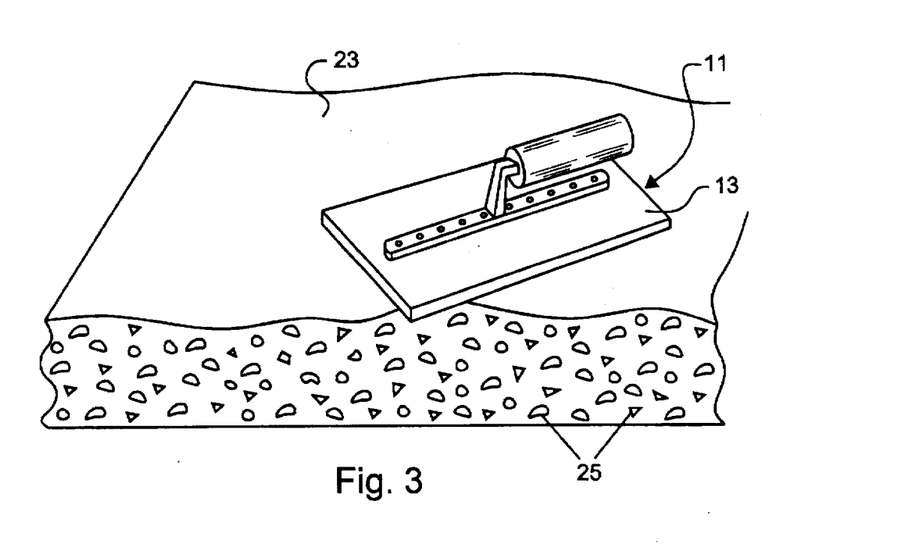
FIG. 3 is a perspective view illustrating the working of the trowel of FIG. 1 in a spreadable material.

As shown in FIG. 3, trowel 11 is used by a skilled worker (not shown) to apply and/or spread a spreadable material such as concrete 23. Concrete 23 includes abrasive particles such as sand, rocks or gravel 25. As blade 13 is moved across the concrete, the cement and abrasive particles impact against the bottom surface 17 of the blade. This has been found to produce a very high bi-axial or trans-axial stress on the flat surface 17 of the blade. That is, the bottom surface of the trowel is stressed in all directions along the flat surface 17. This stress appears to be a result of "lapping" or abrasion of the blade surface against the abrasive particles 25 in the material 23 being spread. The act of troweling creates high (up to 130,000 psi) shallow, (up to 0.0015" deep) bi-axial or trans-axial, compressive, residual stresses in the bottom working surface of the blade. The resulting stress is the cumulative effect of the plastic deformation of micro-regions of the metal by contact between the blade surface and individual particles.

As a new trowel is used, its bottom blade surface becomes stressed through use against concrete or other abrasive particle containing materials. This is often called "breaking-in" of a new trowel. Regardless of the initial residual stress state of the working surface of a conventional trowel, troweling of abrasive materials quickly develops a high, shallow, bi-axial or trans-axial, compressive stress. Such stress development is apparent in the first several hours of use. With further use, stress continues to develop up to a limiting value. The development rate slows as the limit is approached and generally stops after the limit is reached. This limit is approximately sixty percent of the blade material's yield strength.

The stress developed at the bottom surface of the blade remains constant thereafter with use. As the trowel is used, the bottom surface is abraded removing material from the metal blade, but, at the same time, the abrasion will stress the newly presented blade material at the surface. The surface stress in a "broken-in" trowel is, therefore, constant and predictable.

This stress buildup on the bottom working surface occurs when the trowel works with all commonly troweled materials which contain abrasive particles. Such materials include concrete, mortar, plaster, drywall compound and proprietary plaster-like materials containing hard particles in a synthetic carrier and which transform to a hard, plaster-like material upon curing or drying.

Referring again to FIG. 1, blade 13 is provided with a flat working surface 17. A certain shallow level of stress, represented by arrows 27, is intentionally imposed on the working surface of the blade. That level of stress 27 is made substantially equal to the level and depth of stress that the intended spreadable material would impose on working surface 17 during use of trowel 11 with the intended spreadable material.

As shown in FIG. 2, a compensating stress 29 is imposed on top surface 19 of blade 13. The compensating stress 29 compensates for the tendency of blade 13 to bow or distort in shape due to the stress level 27 imposed on the working surface 17 of the blade.

Figure 4:
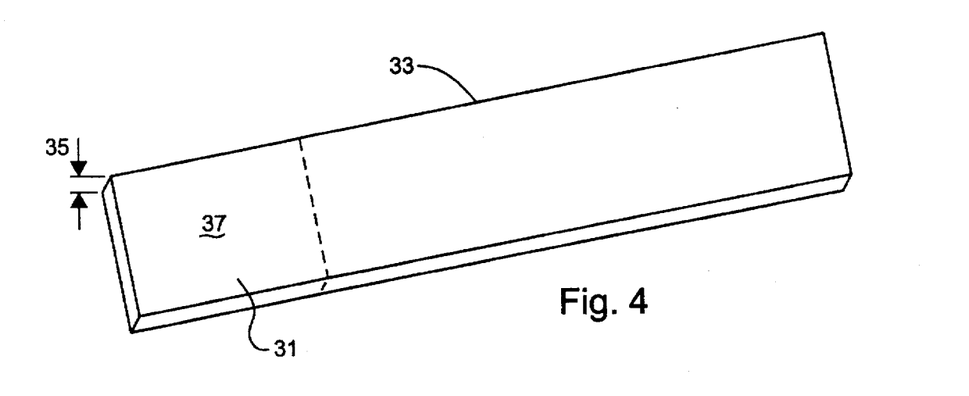
FIG. 4 is a perspective view of a sheet of metal from which the trowel of FIG. 1 is manufactured.

Referring to FIG. 4, blade 13 is manufactured by cutting a blade cell 31 from a flat strip of steel 33 having a thickness 35. Strip 33 is unrolled from a coil and has a width equal to the width of blade 13. Blade cell 31 is cut in a rectangular shape and carries a flat surface 37. Blade cell 31 may be cut by using conventional steel cutting blades or cutting torches, as will suggest itself. Ends of the blade cell 31 can be cut square, round, or at some angle other than 90 degrees.

Flat surface 37 carries a particular residual stress depending on the manner in which the flat strip of steel 33 was formed and finished by its manufacturer. Importantly, the bottom surface 37 is intentionally stressed to a particular stress level. During this intentional stressing step, the surface 37 may be worn by abrasion, for example, which abrasion itself will impose a stress level to the surface 37.

Figure 5:
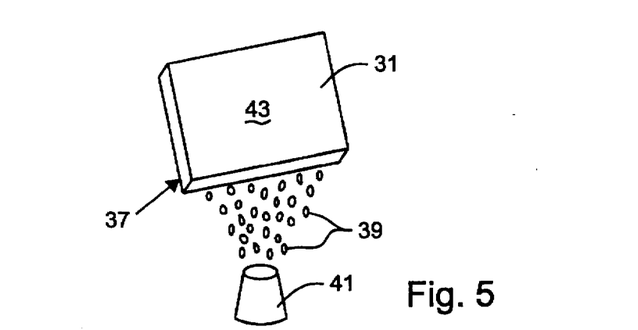
FIG. 5 is a perspective view of a step in the manufacturing process of the trowel of FIG. 1.
Figure 6:
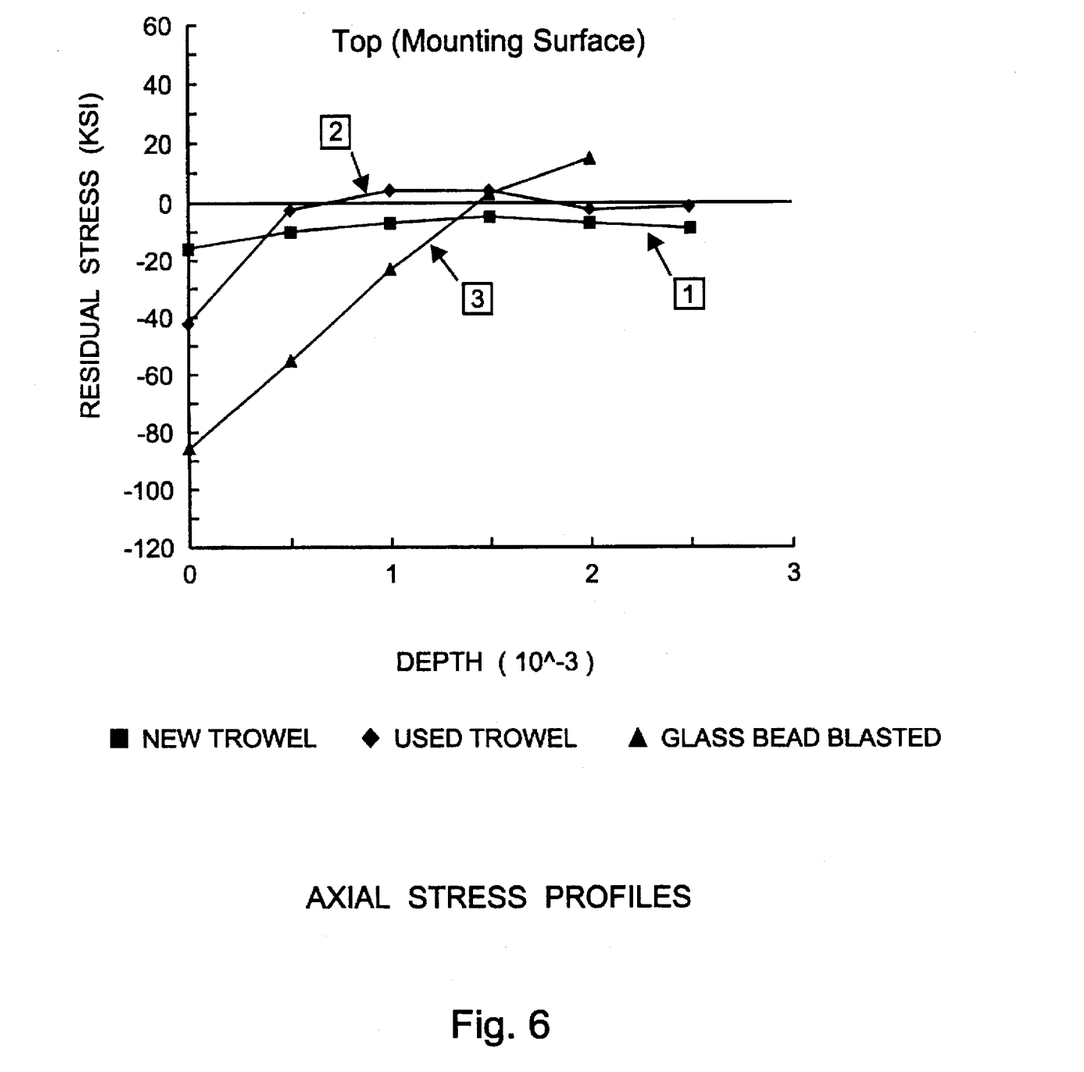
FIG. 6 is a graph showing axial stress profiles on the top (mounting) blade surface for new, used, and glass bead blasted trowels, with tensile stress shown as positive (+) and compressive stress shown as negative (−). The vertical axis shows residual stress measured in KSI (kips per square inch) and the horizontal axis shows depth in thousandths (0.001) of an inch.

As shown in FIG. 5, the flat surface 37 of blade cell 31 is uniformly blasted by individual glass beads 39 of selected sizes. The beads 39 are forced against the blade cell 31 for a predetermined length of time. Blade cell 31 may be moved with respect to a single blasting nozzle 41 from which the beads are shot. Alternatively, cell 31 may be held fixed and a plurality of like nozzles 41 may be used to shoot beads against the surface 37. The blasting is performed so that surface 37 should be stressed uniformly.

After the bottom surface 37 has been uniformly stressed, the top surface 43 of blade cell 31 is also uniformly stressed. The blade cell 31 may be inverted and the same blasting nozzles 41 may be used. Alternatively, nozzles 41 may be located on both sides of blade cell 31 and surfaces 37, 43 are blasted simultaneously. The time during which the two surfaces 37, 43 are subject to blasting may be of the same length. The times and intensity of blasting are predetermined so that subsequent trowels of substantially the same characteristics may be manufactured. Other conditions during the blasting may include, for example, an environment of ambient air and at ambient temperature levels.

In the preferred embodiment, troweling such materials as concrete, plaster, drywall compound, and/or Exterior Insulation Finishing Systems (EIFS) has been found to produce known residual stress profiles in untreated trowel blades. As shown in FIGS. 6–9, axial and transverse residual stress profiles for new (graphical plot 1), used (graphical plot 2), and glass bead blasted (graphical plot 3) trowel blades are plotted. This numerical data was obtained using X-Ray diffraction measurement devices. Sub-surface values were obtained by removing layers via chemical electropolishing and then repeatedly measuring the newly exposed surface. All sub-surface values were corrected for the effect of removed layers. The data plots for the new, used, and blasted trowel blades represent thousands of residual stress measurements.

As shown in FIGS. 6–9, the residual axial and transverse stresses, particularly on the bottom working surface 17 (FIG. 1), change substantially after use (compare graphical plots 1 and 2). Such troweling causes the overall residual stress to "build" on the working surface within a few hours to a working stress level. Hence, steels and other materials used for trowel blades have a natural residual stress limit, or capacity, when subjected to normal troweling uses.

Figure 7:
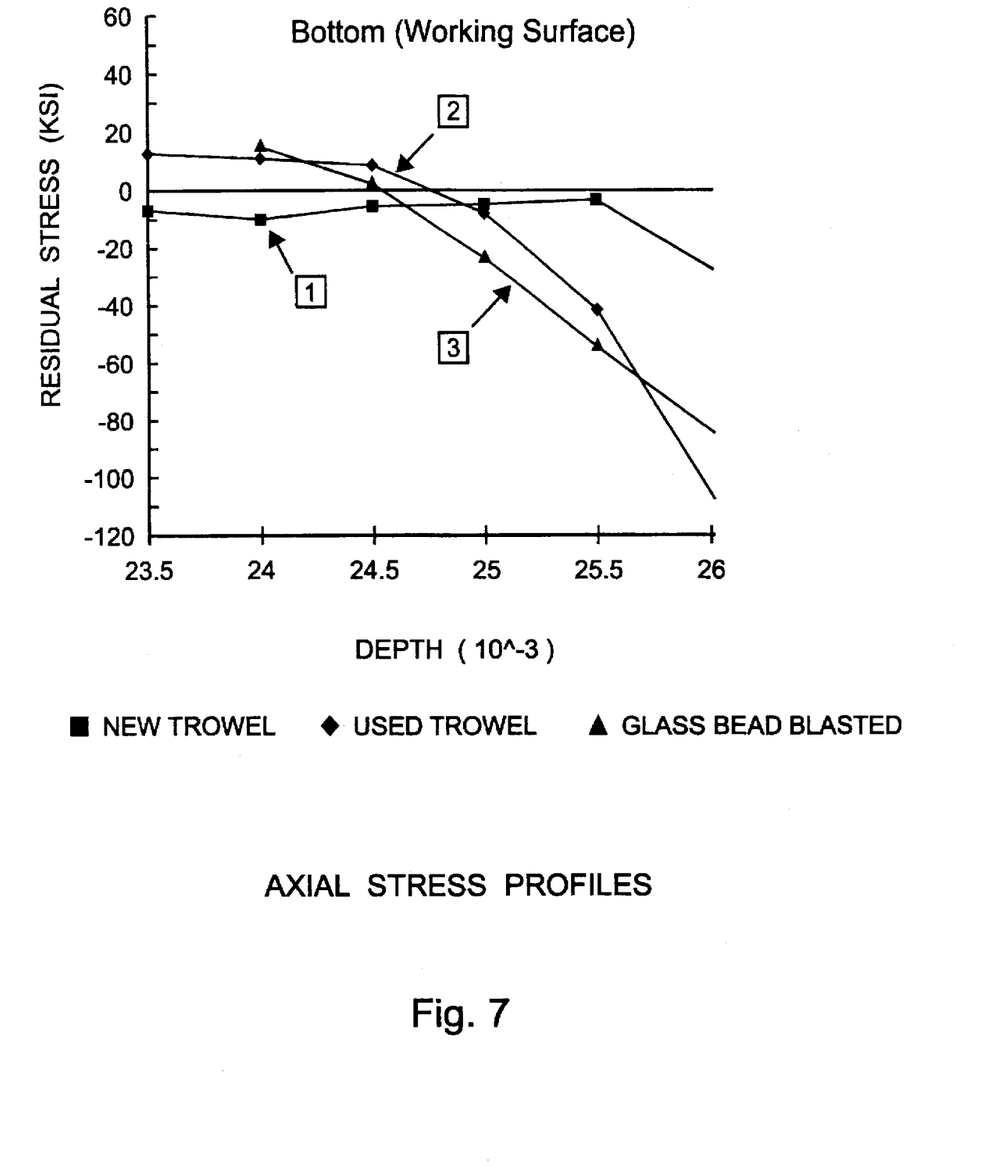
FIG. 7 is a graph showing axial stress profiles on the bottom (working) blade surface for new, used, and glass bead blasted trowels, with tensile stress shown as positive (+) and compressive stress shown as negative (−). The vertical axis shows residual stress measured in KSI (kips per square inch) and the horizontal axis shows depth in thousandths (0.001) of an inch.
Figure 8:
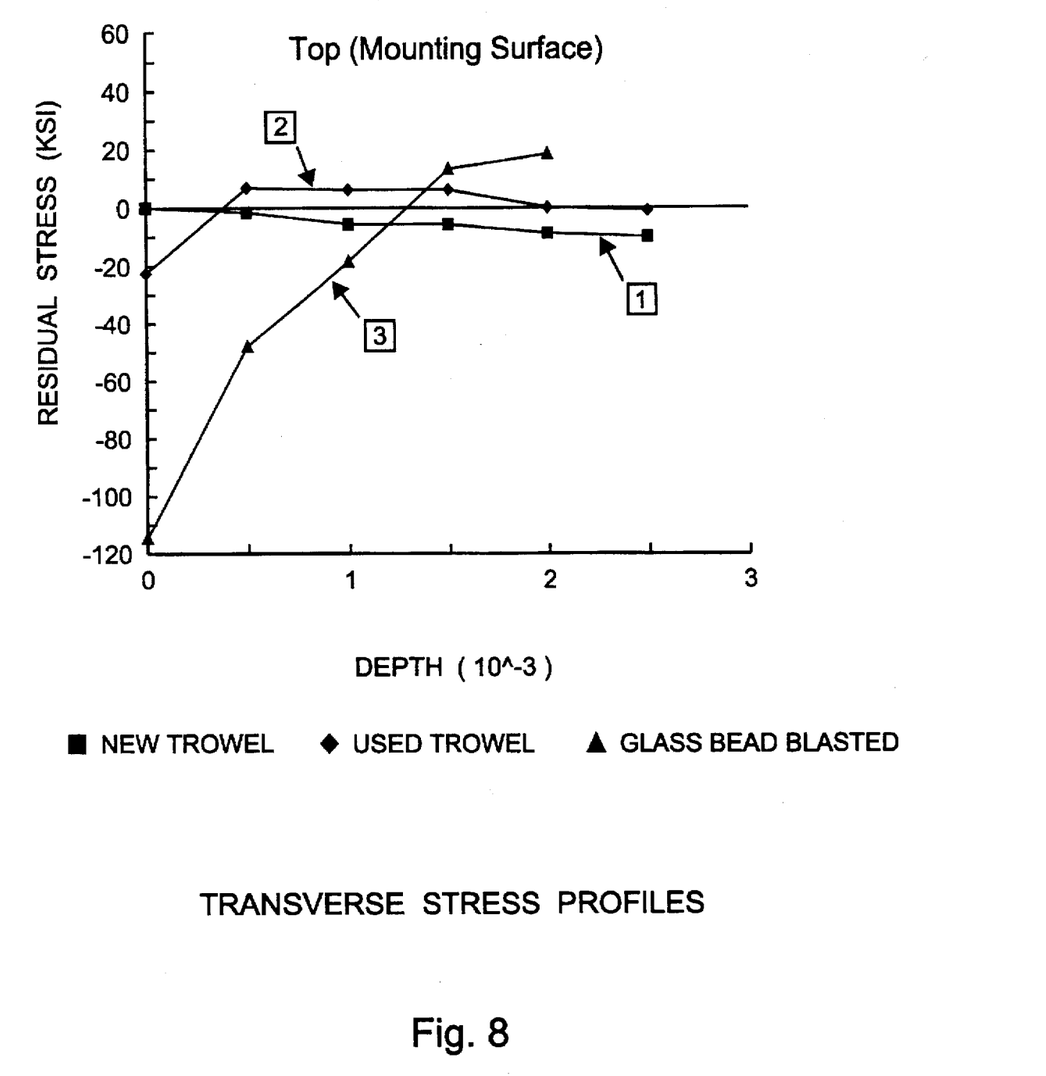
FIG. 8 is a graph showing transverse stress profiles on the top (mounting) blade surface for new, used, and glass bead blasted trowels, with tensile stress shown as positive (+) and compressive stress shown as negative (−). The vertical axis shows residual stress measured in KSI (kips per square inch) and the horizontal axis shows depth in thousandths (0.001) of an inch.
Figure 9:
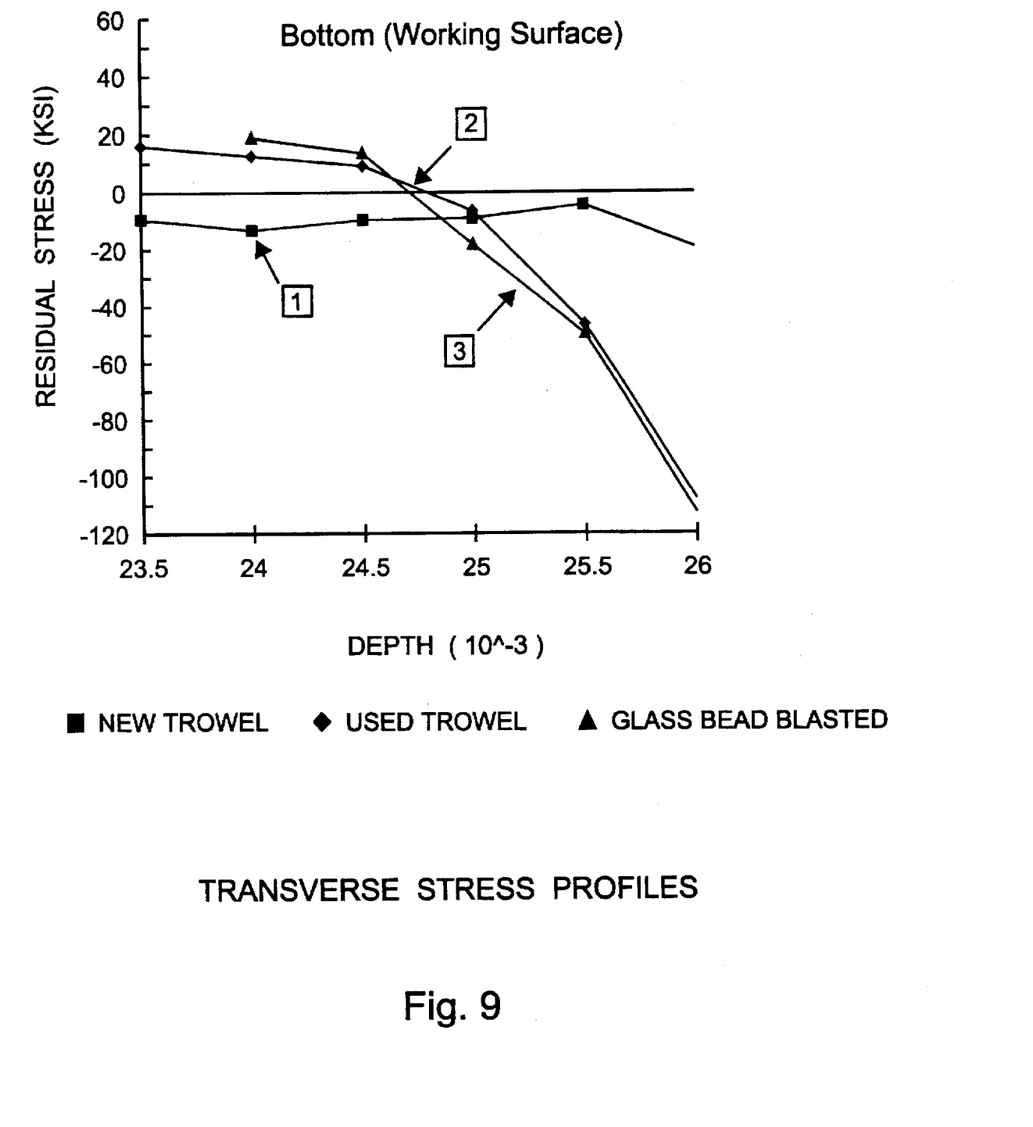
FIG. 9 is a graph showing transverse stress profiles on the bottom (working) blade surface for new, used, and glass bead blasted trowels, with tensile stress shown as positive (+) and compressive stress shown as negative (−). The vertical axis shows residual stress measured in KSI (kips per square inch) and the horizontal axis shows depth in thousandths (0.001) of an inch.

Moreover, once this working stress level is reached, it remains substantially the same or constant with further use of the trowel. As shown in FIGS. 7 and 9, the axial and transverse stresses on the bottom working surface 17 (FIG. 1) for the glass bead blasted trowel (graphical plot 3) and the used trowel (graphical plot 2) remain substantially parallel over the plotted range of depths. As FIG. 7 illustrates, axial stress plots 2 and 3 remain within 15–20 KSI or less of each other across the measured depth range of 23.5–26 thousandths of an inch. As FIG. 9 illustrates, transverse stress plots 2 and 3 remain within 10 KSI or less of each other across the same depth range. Hence, glass bead blasting (graphical plots 3) can produce residual stress profiles, particularly on the bottom working surfaces, that nearly match the natural limit of troweling induced stresses (graphical plots 2) caused by using the trowel.

Referring again to FIGS. 6–9, experiments have shown that asymmetrical build-up of stresses, as shown in graphical plots 2, cause the trowel blades to change shape. Substantial shape changes are likely to occur in the unstiffened transverse direction 16 (perpendicular to mounting 14) of a trowel blade 13 (See FIG. 2). Shape changes can also occur in the axial direction 12.

One set of glass bead blasting parameters that produces desirable stress inducing results is as follows:

Air Pressure: 40 psi

Angle of Impingement: 90 degrees

Striking Distance: 7 inches

Nozzle Traverse Velocity: 0.5 inches per second

Bead Size: 70–100 screen

Nozzle Size: 5/16 inch

This embodiment produces a blast-contact area on the surface of the trowel blade of approximately 1.5 inches, which necessitates several passes to cover the entire surface of the blade. These parameters can be adjusted accordingly to produce wider (or narrower) blast-contact areas which produce substantially similar stress levels per unit area of blade material treated.

Alternatively, instead of using glass beads to impart stress in the surface of blade cell 31, steel shot may be used to treat surfaces 37, 43 and impart stress. The steel shot are propelled against surfaces 37, 43 by, for example, air pressure.

In another embodiment, the top and bottom surfaces 37, 43 may be ground with an abrasive grinder, as for example, a rotating vitrified grinding wheel or a coated abrasive belt to impart controlled stress.

In another embodiment, the top and bottom surfaces 37, 43 may be brushed with wire brushes to impart stress. Such brushing may be by rotary or reciprocal movement.

In another embodiment, the top and bottom surfaces 37, 43 may be brushed with wire brushes whose brush tips terminate in globules of adhesive or metal to impart stress. This technique will impart relatively more stress than conventional wire brushes. Such brushing may be by rotary or reciprocal movement.

In another embodiment, the top and bottom surfaces 37, 43 may be lapped against an abrasive material to impart stress. Such lapping should be uniform.

In another embodiment, the top and bottom surfaces 37, 43 may be polished to impart stress. Such polishing should be uniform.

In another embodiment, the top and bottom surfaces 37, 43 may be rolled by rollers for a predetermined length of time in order to impart stress. A roller (not shown) of a width longer than the width of surfaces 37, 43 is used. The roller is positioned at one end or edge of surface 37 (or 43) and rolled along the elongated and/or narrow direction of the surface 37 (or 43). The roller is forced against the surface at a predetermined force during rolling.

In another embodiment, the top and bottom surfaces 37, 43 may be vibratory finished to impart stress.

In all embodiments, the controlled stress intentionally imposed on surface 37 can be varied to be substantially equal to the stress which is created when smoothing a particular spreadable material. For example, if concrete is to be smoothed by the trowel, then the stress imposed on surface 37 should be substantially equal to the stress which will be created on the blade when the trowel smooths concrete.

The complimentary stress imposed on the back surface 43 of the blade causes the blade to assume a predetermined shape. For example, if it is desired to have a straight, near-flat blade, then the complimentary stress level on top surface 43 should substantially equal the level of stress on bottom surface 37.

If, on the other hand, it is desired that the blade have a slight bow, i.e., a convex shape in the narrow blade width direction on bottom surface 37, then the complimentary stress on the top surface 43 should be lesser than the stress level on the bottom surface 37. By varying residual stresses on the top mounting surface of a trowel blade, the blade shape can be intentionally manipulated so that it is anywhere from very convex to flat on the working surface. In a particular case, the blade shape may even be formed concave.

While only one preferred embodiment, and several alternative embodiments, of the invention have been described hereinabove, those of ordinary skill in the art will recognize that the embodiments may be modified and altered without departing from the central spirit and scope of the invention. Thus, the embodiments described hereinabove are to be considered in all respects as illustrative and not restrictive, the scope of the invention being indicated by the appended claims, rather than by the foregoing descriptions, and all changes which come within the meaning and range of equivalency of the claims are intended to be embraced herein.

What is claimed is:

1. A method of manufacturing a metal trowel blade for applying and smoothing an abrasive, spreadable material, the blade having a bottom working surface that is forced against the spreadable material and a top surface opposite the bottom working surface and to which a handle may be attached, comprising the steps of:

forming the blade from a sheet of metal and having a bottom working surface and a top surface;

intentionally imposing a biaxial residual compressive stress of a predetermined magnitude on the working surface of the blade, said predetermined magnitude being such that the biaxial residual compressive stress on the working surface of the blade will remain substantially constant when the trowel blade is used to smooth the abrasive spreadable material since use will restore residual compressive stresses as prestressed blade material is abraded away by use.

2. The method of claim 1 wherein said predetermined magnitude substantially equals in magnitude the working stress that is created at the working surface of the blade when smoothing the spreadable material.

3. The method of claim 1 wherein the step of constructing the blade includes providing a metal strip; and cutting a generally planar blade of desired shape from the strip.

4. The method of claim 1 wherein the step of intentionally imposing a biaxial residual compressive stress includes uniformly blasting the working surface of the blade with glass beads for a predetermined length of time under predetermined conditions.

5. The method of claim 1 wherein the step of intentionally imposing a controlled residual stress includes uniformly shot blasting the working surface of the blade for a first predetermined length of time under first predetermined conditions.

6. The method of claim 1 wherein the step of intentionally imposing a controlled residual stress includes uniformly grinding the working surface of the blade for a predetermined length of time under predetermined conditions.

7. The method of claim 1 wherein the step of intentionally imposing a controlled residual stress includes uniformly wire brushing the working surface of the blade for a predetermined length of time under predetermined conditions.

8. The method of claim 1 wherein the step of intentionally imposing a controlled residual stress includes uniformly wire brushing the working surface of the blade for a predetermined length of time under predetermined conditions, using wire brushes which are tipped with globules of hardened material.

9. The method of claim 1 wherein the step of intentionally imposing a controlled residual stress includes uniformly lapping the working surface of the blade for a predetermined length of time under predetermined conditions.

10. The method of claim 1 wherein the step of intentionally imposing a controlled residual stress includes uniformly polishing the working surface of the blade for a predetermined length of time under predetermined conditions.

11. The method of claim 1 wherein the step of intentionally imposing a controlled residual stress includes uniformly rolling the working surface of the blade for a predetermined length of time under predetermined conditions.

12. The method of claim 1 wherein the step of intentionally imposing a controlled residual stress includes uniformly vibratory finishing the working surface of the blade for a predetermined length of time under predetermined conditions.

13. The method of claim 1 wherein the step of constructing the blade includes forming an elongate beam having a flat working surface extending along the length of said beam and a flat back surface extending along an opposite side of said beam;

and wherein the step of intentionally imposing a controlled residual stress includes:
    positioning a roller with a width that extends across the beam working surface and against the beam working surface at a first end of the beam, and
    rolling said roller along the elongate direction of the beam, and
    forcing the roller against the beam with a predetermined force, and
    rolling the roller along the beam in the elongate direction to a second end of the beam.

14. A method of manufacturing a metal trowel blade for applying and smoothing an abrasive, spreadable material, the blade having a bottom working surface that is forced against the spreadable material and a top surface opposite the bottom working surface and to which a handle may be attached, comprising the steps of:
    forming the blade from a sheet of metal and having a bottom working surface and a top surface;
    intentionally imposing a biaxial residual compressive stress of a predetermined magnitude on the working surface of the blade; and
    intentionally imposing a complimentary biaxial residual compressive stress on the top surface of the blade to intentionally compensate for any undesired blade shape changes caused by the intentionally imposed biaxial residual compressive stress on the bottom working surface of the blade;
    said predetermined magnitude being such that the biaxial residual compressive stress on the working surface of the blade will remain substantially constant when the trowel blade is used to smooth the abrasive, spreadable material since use will restore residual compressive stresses as prestressed blade material is abraded away by use.

15. The method of claim 14 wherein said predetermined magnitude substantially equals in magnitude the working stress that is created at the working surface of the blade when smoothing the spreadable material.

16. The method of claim 14 wherein the step of constructing the blade includes providing a metal strip; and cutting a generally planar blade of desired shape from the strip.

17. The method of claim 14 wherein the step of intentionally imposing a biaxial residual compressive stress includes uniformly blasting the working surface of the blade with glass beads for a first predetermined length of time under predetermined conditions; and wherein the step of intentionally imposing the complimentary biaxial residual compressive stress includes uniformly blasting with glass beads the back surface of the blade for a second predetermined length of time and under second predetermined conditions.

18. The method of claim 17 wherein said first predetermined length of time is substantially equal to said second predetermined length of time.

19. The method of claim 17 wherein said first predetermined conditions are substantially the same as said second predetermined conditions.

20. The method of claim 14 wherein the steps of intentionally imposing a controlled residual stress includes uniformly shot blasting the working surface of the blade for a first predetermined length of time under first predetermined conditions; and wherein the step of intentionally imposing a complimentary residual stress includes shot blasting the back surface of the blade for a second predetermined length of time and under second predetermined conditions.

21. The method of claim 14 wherein the step of intentionally imposing a controlled residual stress includes uniformly grinding the working surface of the blade for a predetermined length of time under predetermined conditions; and wherein the step of intentionally imposing a complimentary residual stress includes grinding the back surface of the blade for a predetermined length of time and under predetermined conditions.

22. The method of claim 14 wherein the step of intentionally imposing a controlled residual stress includes uniformly wire brushing the working surface of the blade for a predetermined length of time under predetermined conditions; and wherein the step of intentionally imposing a complimentary residual stress includes wire brushing the back surface of the blade for a predetermined length of time and under predetermined conditions.

23. The method of claim 14 wherein the step of intentionally imposing a controlled residual stress includes uniformly wire brushing the working surface of the blade for a predetermined length of time under predetermined conditions; and wherein the step of intentionally imposing a complimentary residual stress includes wire brushing the back surface of the blade for a predetermined length of time and under predetermined conditions, using wire brushes which are tipped with globules of hardened material.

24. The method of claim 14 wherein the step of intentionally imposing a controlled residual stress includes uniformly lapping the working surface of the blade for a predetermined length of time under predetermined conditions; and wherein the step of intentionally imposing a complimentary residual stress includes lapping the back surface of the blade for a predetermined length of time and under predetermined conditions.

25. The method of claim 14 wherein the step of intentionally imposing a controlled residual stress includes uniformly polishing the working surface of the blade for a predetermined length of time under predetermined conditions; and wherein the step of intentionally imposing a complimentary residual stress includes polishing the back surface of the blade for a predetermined length of time and under predetermined conditions.

26. The method of claim 14 wherein the step of intentionally imposing a controlled residual stress includes uniformly surface rolling the working surface of the blade for a predetermined length of time under predetermined conditions; and wherein the step of intentionally imposing a complimentary residual stress includes surface rolling the back surface of the blade for a predetermined length of time and under predetermined conditions.

27. The method of claim 14 wherein the step of intentionally imposing a controlled residual stress includes uniformly vibratory finishing the working surface of the blade for a predetermined length of time under predetermined conditions; and wherein the step of intentionally imposing a complimentary residual stress includes vibratory finishing the back surface of the blade for a predetermined length of time and under predetermined conditions.

28. The method of claim 14 wherein the step of constructing the blade includes forming an elongate beam having a flat working surface extending along the length of said beam and a flat back surface extending along an opposite side of said beam;

and wherein the step of intentionally imposing a complimentary residual stress includes:

positioning a roller with a width that extends across the beam working surface and against the beam working surface at a first end of the beam, and rolling said roller along the elongate direction of the beam, and forcing the roller against the beam with a predetermined force, and rolling, the roller along the beam in the elongate direction to a second end of the beam;

and wherein the step of intentionally imposing a complimentary residual stress includes:

positioning a roller with a width that extends across the beam back surface and against the beam back surface at a first end of the beam, and rolling the roller along the elongate direction of the beam, and forcing the roller against the beam with a predetermined force, and rolling the roller along the beam in the elongate direction to a second end of the beam.

\* \* \* \* \*